United States Patent [19]

Ward

[11] 4,187,942
[45] Feb. 12, 1980

[54] TRANSFER BEAM CONVEYOR

[75] Inventor: Frederick G. Ward, Loughborough, England

[73] Assignee: Herbert Morris Ltd., Loughborough, England

[21] Appl. No.: 918,425

[22] Filed: Jun. 23, 1978

Related U.S. Application Data

[63] Continuation of Ser. No. 743,655, Nov. 22, 1976, abandoned.

[30] Foreign Application Priority Data

Nov. 27, 1975 [GB] United Kingdom ............... 48825/75

[51] Int. Cl.² .............................................. B65G 25/02
[52] U.S. Cl. .................................. 198/345; 198/774; 414/222; 414/750
[58] Field of Search ............... 198/345, 773, 774, 775, 198/776; 414/677, 156, 750, 222

[56] References Cited

U.S. PATENT DOCUMENTS

| 2,227,145 | 12/1940 | Lex et al. | 198/345 |
| 2,416,763 | 3/1947 | Lynch | 198/774 |
| 3,028,945 | 4/1962 | Harke et al. | 198/345 |
| 3,370,494 | 2/1968 | Schenck | 198/345 X |
| 3,473,643 | 10/1969 | Janiske | 198/775 |
| 3,575,395 | 4/1971 | Gentry | 198/774 X |
| 3,648,861 | 3/1972 | Fabian et al. | 198/774 X |
| 3,736,997 | 6/1973 | Bottorf | 198/776 X |
| 3,838,769 | 10/1974 | Fishburne et al. | 198/750 |
| 3,850,287 | 11/1974 | Petros | 198/774 |

FOREIGN PATENT DOCUMENTS

1416332 12/1975 United Kingdom ..................... 198/774

Primary Examiner—James L. Rowland
Attorney, Agent, or Firm—Norris & Bateman

[57] ABSTRACT

A transfer unit for transporting heavy loads from station to station for work to be carried out on the load on a grillage divided up into a plurality of passageways, rails being mounted in the passageways for carriages or bogies carrying jacks for lifting a beam on each carriage to raise the load from the grillage with means for driving the carriages or bogies in synchronism and fairing jacks for lining up the load on the grilling or on the beam.

7 Claims, 12 Drawing Figures

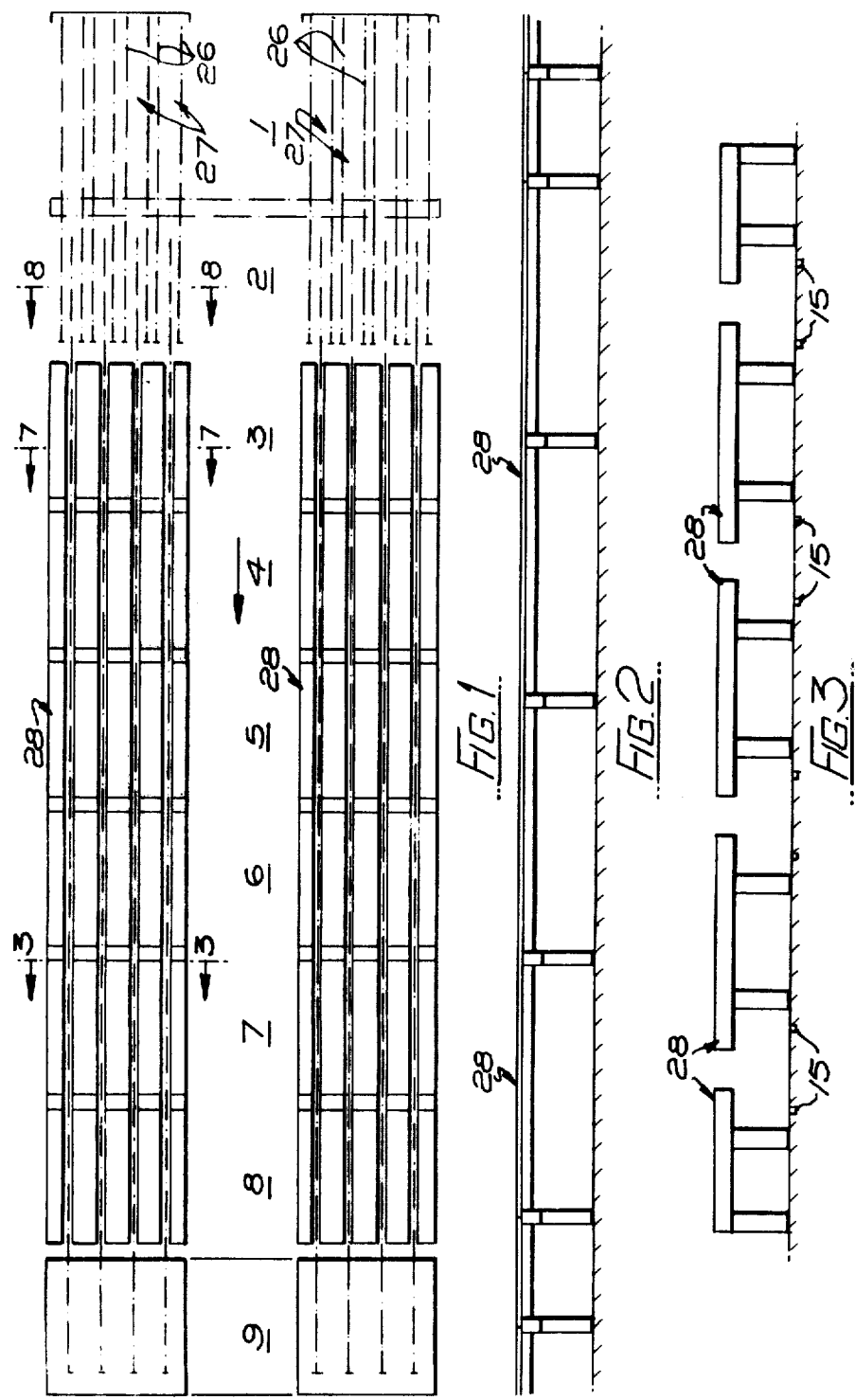

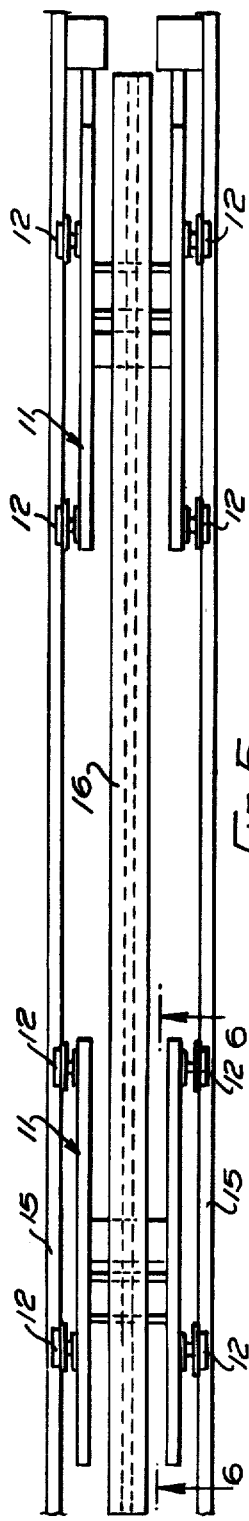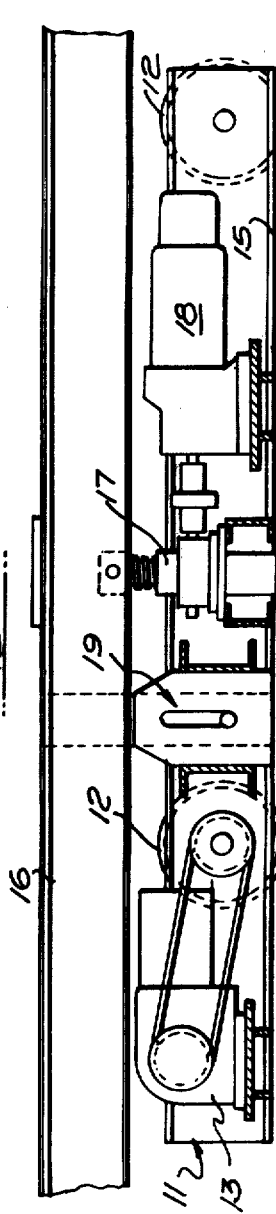

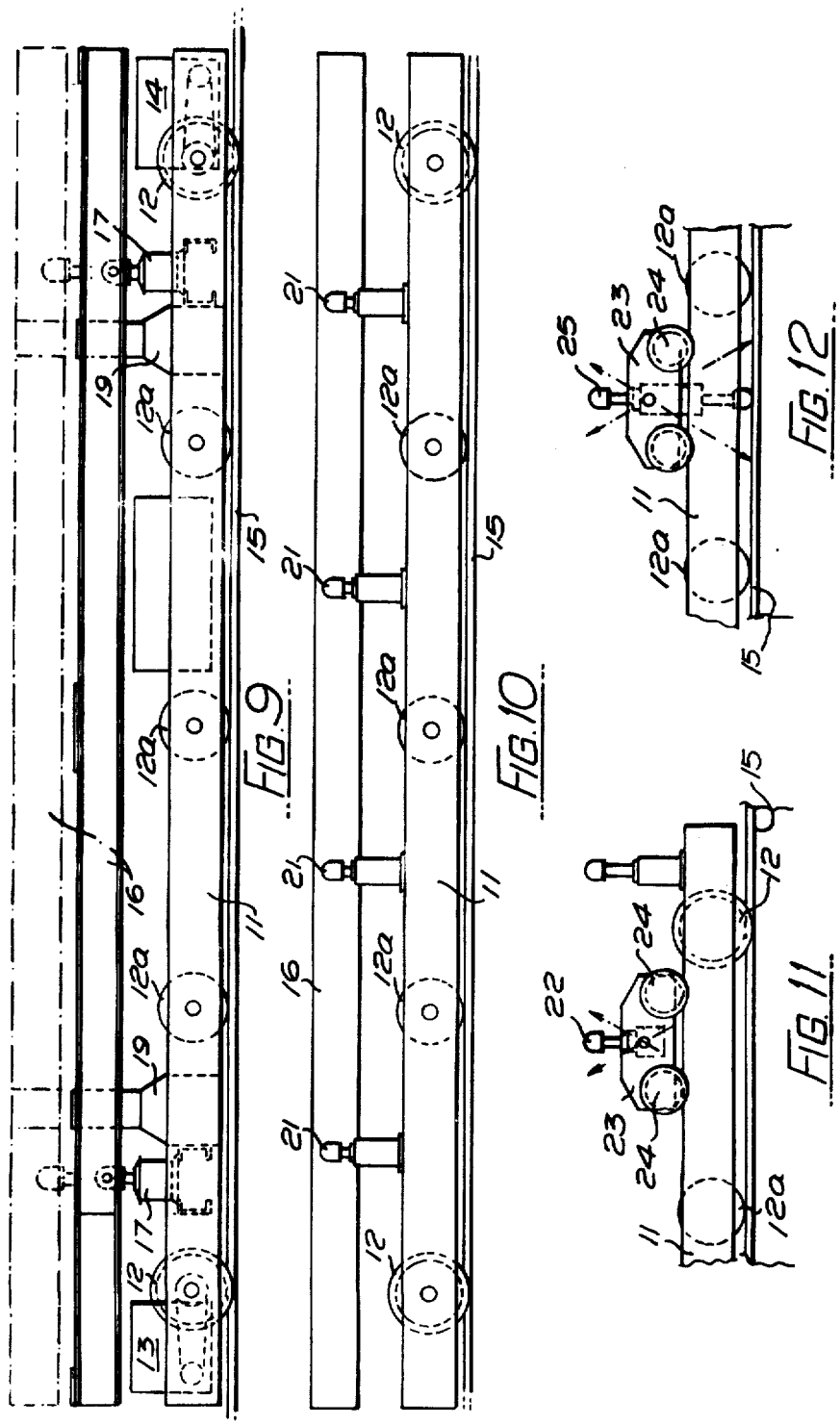

TRANSFER BEAM CONVEYOR

This is a continuation of application Ser. No. 743,655, filed Nov. 22, 1976, now abandoned.

This invention relates to improvements in conveyors or transfer units for transporting loads during or after fabrication and where the carrying face of the load is not a flat plane and thus not adaptable for carrying on a conventional roller conveyor.

According to the invention a transfer unit comprises a lifting beam carried out on a structure or unit at a plurality of stations, the beam being mounted on a carriage or bogie and lifted from the carriage or bogie and lowered onto a grillage by screw or other jacks mounted on the carriage or bogie and driven by electric or other motors, guides being provided to control the vertical movement of the beam, the carriage or bogie travelling on rails for traversing the load on the beam from station to station.

Figure 7:
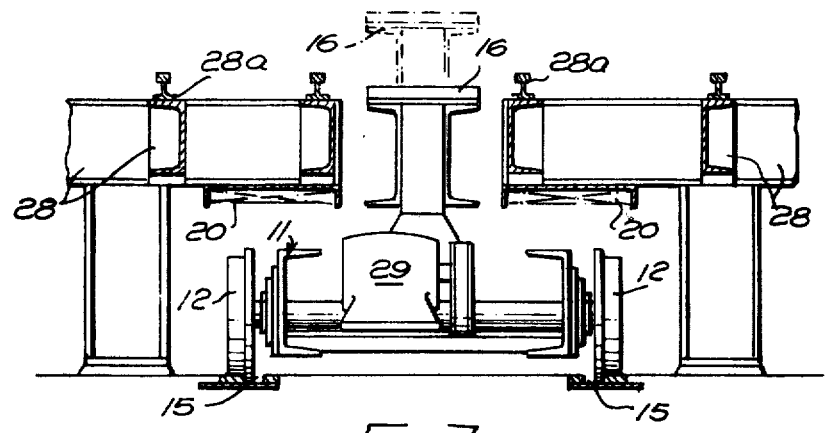
Figure 8:
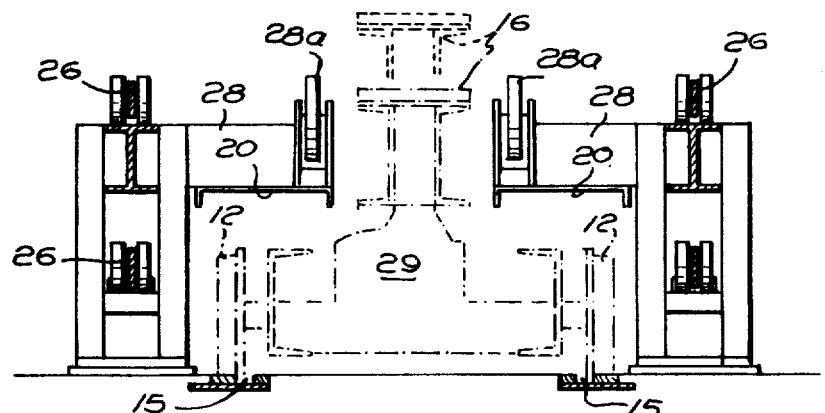

The invention will be described with reference to the accompanying drawings:

FIG. 1 is a plan view of the work support grillage;
FIG. 2 is an enlarged side view of one station;
FIG. 3 is a section enlarged on line 3—3 FIG. 1;
FIG. 4 is a side elevation of a transporter unit
FIG. 5 is a plan view of FIG. 4;
FIG. 6 is a section on line 6—6 FIG. 5;
FIG. 7 is a section enlarged on line 7—7 FIG. 1;
FIG. 8 is a section enlarged on line 8—8 FIG. 1;
FIGS. 9 & 10 are side elevations of further transporter units;
FIGS. 11 & 12 are side elevations of two modified transporter units.

As applied to the fabrication of a structure or unit for incorporating in a ship a plurality of in line stations 1-8 are provided and building commences at station member 1 with the welding together of plates to give the unit the required size, and the unit then passes to station 2 where further work is carried out and so on through other stations so that by station number 8 a heavy fabricated unit measuring for example 12 meter by 12 meter and weighing 100 tons is produced although any size or weight can be handled. The number of work stations varies to suit the type of work being performed, as the units can be used in a variety of industries. A station number 9 may be provided at which the units are loaded on to the road transporter but they could equally well be transferred to another part of the workshop by transporter or transfer units. Each transfer unit or transporter bogie is formed with a body 11 supported on two or more drive wheels 12 driven by an electric geared motor 13 and a chain or belt drive (FIG. 6) or by means of an electric or hydraulic motor in conjunction with geared reduction units, spur gears, chain or belt drives. The drive wheels 12 may be keyed to shafts which rotate in ball or roller bearings supported from the body 11 or the ball or roller bearings may be incorporated in the drive wheels with fixed axles supported from the main structure. A secondary drive unit 14 may be incorporated (FIG. 9). The drive wheels travel on rail tracks 15. The lifting beam 16 is raised or lowered in the transfer unit illustrated by means of hydraulic jacks 17 powered by the power packs 18 but may be operated by means of screw jacks driven by an electric geared motor 29 (or an electric motor through coupling and gear reduction unit), or by spur gear pinions and racks. Guides 19 are incorporated to control the direction of movement of the lifting beam 16. The lifting beam is raised and lowered in a vertical direction, the movement being controlled by guides 19. The forward and reverse motions of each transporter are obtained by its own drive unit. The drive units are all identical using matched motors and the travel speeds are for all practical purposes identical.

Electric power for the drive motors 13 and 14 and for control of the various motions is obtained by means of conductor wires and current collectors 20 or by cable and cable reel from a common control panel. The transporters individually are positioned beneath the load to be moved and when in position the beam raising and lowering and forward and reverse travel are effected by push button means, for simultaneously controlling all of the transporters selected for operation at the control panel. For positioning the transfer units 11 beneath the load units the control panel incorporates a suitable meter for each unit indicating its position relative to a given datum line on each work station.

During the fabrication of plate panels, panel assemblies and panel blocks, at the various work stations it is necessary to carry out a 'Fairing' operation which is the aligning of two or more pieces of structure prior to welding together and the equipment necessary to achieve this for incorporation on the transfer unit.

The fairing is achieved by raising the plate panel by applying forces to the underside thereof and bringing it into contact with the matrix or individual stiffening components to permit the welding operation to take place. The necessary forces are obtained by mounting a number of hydraulic jacks 21 on the body 11 the force to be applied on the selected area of plate. To obtain a more accurate positioning, the transfer unit may be travelled in a forward or reverse direction. The purpose and method of fairing is as described and as it is necessary to apply the fairing force to a selected area, the position of the fairing jack to a datum (normally one end of the work station) may be given by a readout on the control panel.

An alternative method of Fairing can be obtained by the use of a moving fairing jack 22 (FIG. 11) mounted on a carriage of bogie 23 on wheels 24 on rails 15 on the transporter body 11.

With the above described jack 22 all re-action forces pass through the transporter body 11, drive wheels and rail track 15 to the ground, but where very heavy fairing forces and required resulting in high structual and wheel stresses these are reduced by a double extension hydraulic jack 25 (FIG. 12) which transmits the fairing force direct to the rail track 15 and the ground.

All types of moving fairing jacks, 21,22,25, incorporate a travel drive unit (forward and reverse) as described for the travel of the transfer unit; the supply of electric power, control and positioning being as described for the main transfer unit.

In order to distribute the load on the transporter or transfer unit more evenly on the rails 15 the body 11 may extend the full length of the beam 16 on additional wheels 12a (FIGS. 9 and 10).

FIG. 8 shows the load being transferred from the conveyor 27 to the beam 16 for transporting by the transfer unit.

Under normal operating conditions one, two or more transporter or transfer units are employed for transporting a unit load and are electrically or electronically controlled to allow simultanuous operation of the various individual movements: raise beam, lower beam, travel unit forward, and travel unit reverse.

FIGS. 1-3 show a production line used in the fabrication of plate panels (two or more plates together), panel assemblies (plate panel with matrix or individual stiffening components welded into position) and panel blocks (a combination of panel assemblies welded together) required in the construction of ships. The line comprises a number of work stations 1-8 where the work progresses from the production of plate panels through the various work stages to the completion of the panel assemblies or panel blocks. The panel assemblies or panel blocks may be of almost unlimited size and weight several hundred tons.

The work stations comprise multi-strand conveyors 27 incorporating chains with supporting rollers for unstiffening plates where the transfer unit travel between the chain strands 26 for transferring to a grillage type structure as shown in FIG. 1.

In operation, the transporter or transfer units are travelled beneath a load unit by remote controls, the lifting beam 16 is then raised lifting the load unit from the grillage 28 or conveyor 27 where it has been standing during one of the fabricating operations, the transfer unit is then travelled to the next selected working station where the lifting beam 16 is lowered placing the load unit onto the grillage for further fabrication to be carried out. Ultimately the completed panel assembly or panel block is transferred by the transporter or transfer unit to the station 9 where it is lowered on to a road vehicle for travelling to the ship for erection or transferred directly to a position where it is unloaded by crane directly onto the ship or off-loaded for storage. Guide rails or rollers 28a may be provided on the grillage 28 to support the load thereon.

What I claim is:

1. Apparatus for progressively fabricating relatively heavy articles comprising a stationary work supporting grillage having a series of successive work stations spaced therealong and divided longitudinally into a plurality of side by side passageways, rail means extending along each of said passageways, at least one carriage mounted for movement along each of said rail means, each carriage comprising a body mounting at least two adjustable jacks and a beam supported by the jacks, said beam extending along the associated passageway, means for actuating said jacks for vertically displacing said beam between a lowered position wherein it lies below an article structure in a work station and a raised position wherein it lifts that article structure up from the grillage at the work station preparatory to movement of the carriage to the next work station for further work thereon and means on each carriage body for guiding vertical movement of the associated beam, means on each carriage body providing fairing jacks adjustable for positionally engaging the article structure on the beam, individual drive means on each carriage body for driving the carriage along said rail means, whereby each carriage in a passageway may be positioned at a work station having article structure thereon, operated to engage and raise that article structure up off the fairing jacks and up from the grillage at that station, then driven to a succeeding station along the grillage and then lowered to deposit the article structure on the grillage for further work at that succeeding station.

2. Apparatus as defined in claim 1, wherein additional fairing jack means are provided mounted for movement along each carriage body for selective location prior to adjustment to engage the article structure.

3. Apparatus for transporting relatively heavy articles comprising:
    a stationary work support grillage divided longitudinally into a plurality of side-by-side passages, each of the passages having a set of rails extending therealong,
    a separate transporter unit in each of said passages, each transporter unit comprising a wheeled body structure mounted on said set of rails for movement therealong, individual drive means on the body structure for driving the body structure along the set of rails between a plurality of work stations spaced apart along the grillage, at least two adjustable jacks mounted on the body structure, a beam supported on the jacks and extending longitudinally of the passage and providing a support surface, means for guiding vertical movement of the beam, means for actuating said jacks for vertically displacing the beam between a lowered position where the support surface is below the level of the grillage and raised position where the surface is above the level of the grillage whereby an article supported on the grillage at a first work station can be lifted by the beams off the grillage, transported by the transporter units to any of the other work stations and lowered by the beams on to the grillage,
    and each body structure carrying a plurality of independently operable fairing jacks which are operable independently of the jacks which support the beam whereby localized lifting forces can be applied to the underside of an article supported on the grillage at a work station by means of the fairing jacks of a transporter unit positioned beneath the article at said station.

4. Apparatus as claimed in claim 3, wherein each fairing jack is mounted on a carriage displaceable relative to the body structure in the direction of the length of the beam.

5. Apparatus as claimed in claim 4, in which each fairing jack has two opposed extensible members one of which is arranged to engage the underside of an article supported on the grillage and the other is arranged to abut said set of rails.

6. Apparatus as claimed in claim 3, wherein each body structure comprises a pair of wheeled bogies each carrying at least one of said adjustable jacks and drive means for the bogie.

7. Apparatus as claimed in claim 3, wherein each body structure comprises a pair of parallel support members which are mounted on a plurality of pairs of wheels and which extend for substantially the length of the beam.

* * * * *